(12) United States Patent
Imaizumi et al.

(10) Patent No.: US 10,590,629 B2
(45) Date of Patent: Mar. 17, 2020

(54) WORKING VEHICLE

(71) Applicant: Komatsu Ltd., Tokyo (JP)

(72) Inventors: Masaaki Imaizumi, Mooka (JP);
Isamu Satou, Hitachinaka (JP)

(73) Assignee: KOMATSU LTD., Tokyo (JP)

( * ) Notice: Subject to any disclaimer, the term of this patent is extended or adjusted under 35 U.S.C. 154(b) by 125 days.

(21) Appl. No.: 15/507,360

(22) PCT Filed: Mar. 29, 2016

(86) PCT No.: PCT/JP2016/060223
§ 371 (c)(1),
(2) Date: Feb. 28, 2017

(87) PCT Pub. No.: WO2017/077723
PCT Pub. Date: May 11, 2017

(65) Prior Publication Data
US 2017/0284066 A1 Oct. 5, 2017

(51) Int. Cl.
*E02F 9/26* (2006.01)
*E02F 9/24* (2006.01)
(Continued)

(52) U.S. Cl.
CPC ............... *E02F 9/245* (2013.01); *E02F 9/24* (2013.01); *E02F 9/26* (2013.01); *E02F 9/261* (2013.01); *B60Q 9/005* (2013.01); *E02F 9/0858* (2013.01)

(58) Field of Classification Search
CPC .......... G05D 2201/0201; A01B 69/001; G05B 2219/45017; B60Q 9/005; E02F 9/24;
(Continued)

(56) References Cited

U.S. PATENT DOCUMENTS 6,470,606 B1 * 10/2002 Nagahiro ............... E02F 3/847
37/348
7,466,337 B2 * 12/2008 Sawada .................. H04N 7/183
348/148
(Continued)

FOREIGN PATENT DOCUMENTS

CN 103348674 A 10/2013
CN 105408551 A 3/2016
(Continued)

OTHER PUBLICATIONS

Internationa Search Report and Written Opinion dated Jun. 21, 2016, issued for PCT/JP2016/060223.
(Continued)

*Primary Examiner* — Robert J Hance
(74) *Attorney, Agent, or Firm* — Locke Lord LLP

(57) ABSTRACT

A working vehicle includes a vehicle main body to which a tire is mounted, an excavation member coupled to the vehicle main body on a front side of the vehicle main body and that includes an end part arranged on an outer side of the tire in a vehicle-width direction of the vehicle main body, a hydraulic cylinder arranged at a center part in the vehicle-width direction and that is to move the excavation member, a housing that houses a power transmission mechanism to transmit power to the tire, and a camera supported by a part of the vehicle main body on a lower side of the hydraulic cylinder and on an upper side of the housing and that acquires an image of a region that includes end parts on both sides of the excavation member and that is between the excavation member and the tire.

6 Claims, 8 Drawing Sheets

(51) Int. Cl.
*B60Q 9/00* (2006.01)
*E02F 9/08* (2006.01)

(58) Field of Classification Search
CPC ... E02F 9/245; E02F 9/26; E02F 9/261; E02F 9/264
See application file for complete search history.

(56) References Cited

U.S. PATENT DOCUMENTS

| | | | |
|---|---|---|---|
| 9,366,006 B2 | 6/2016 | Morinaga et al. | |
| 9,845,051 B2* | 12/2017 | Kowatari | B60R 1/00 |
| 9,956,912 B2 | 5/2018 | Asada | |
| 2003/0085995 A1* | 5/2003 | Sawada | H04N 7/183 |
| | | | 348/118 |
| 2011/0141281 A1* | 6/2011 | Barefoot | B60R 1/00 |
| | | | 348/148 |
| 2013/0088593 A1* | 4/2013 | Ishimoto | E02F 9/226 |
| | | | 348/143 |
| 2013/0222573 A1* | 8/2013 | Onuma | E02F 9/24 |
| | | | 348/82 |
| 2014/0088824 A1* | 3/2014 | Ishimoto | E02F 9/0841 |
| | | | 701/34.4 |
| 2014/0146167 A1* | 5/2014 | Friend | G01S 17/023 |
| | | | 348/118 |
| 2015/0085123 A1* | 3/2015 | Tafazoli Bilandi | G01S 17/023 |
| | | | 348/148 |
| 2015/0116495 A1 | 4/2015 | Kowatari et al. | |
| 2015/0138338 A1 | 5/2015 | Asada | |
| 2016/0006947 A1* | 1/2016 | Kowatari | B60R 1/00 |
| | | | 348/148 |
| 2016/0060841 A1 | 3/2016 | Morinaga et al. | |
| 2016/0217331 A1* | 7/2016 | Kowatari | E02F 9/261 |
| 2018/0130222 A1* | 5/2018 | Tafazoli Bilandi | G06T 7/70 |

FOREIGN PATENT DOCUMENTS

| | | |
|---|---|---|
| JP | 54-106361 U | 1/1978 |
| JP | 10-046632 A | 2/1998 |
| JP | 11-036382 A | 2/1999 |
| JP | 11-217853 A | 8/1999 |
| JP | 2002-371595 A | 12/2002 |
| JP | 2004-359168 A | 12/2004 |
| JP | 2006-037662 A | 2/2006 |
| JP | 2008-303574 A | 12/2008 |
| JP | 2008303574 A * | 12/2008 |
| JP | 3179920 U | 11/2012 |
| JP | 5789060 B1 | 10/2015 |
| KR | 20140095612 A | 8/2014 |
| WO | 2012/157379 A1 | 11/2012 |

OTHER PUBLICATIONS

Supplementary European Search Report dated Mar. 28, 2018, issued for the European patent application No. 16838018.6.

* cited by examiner

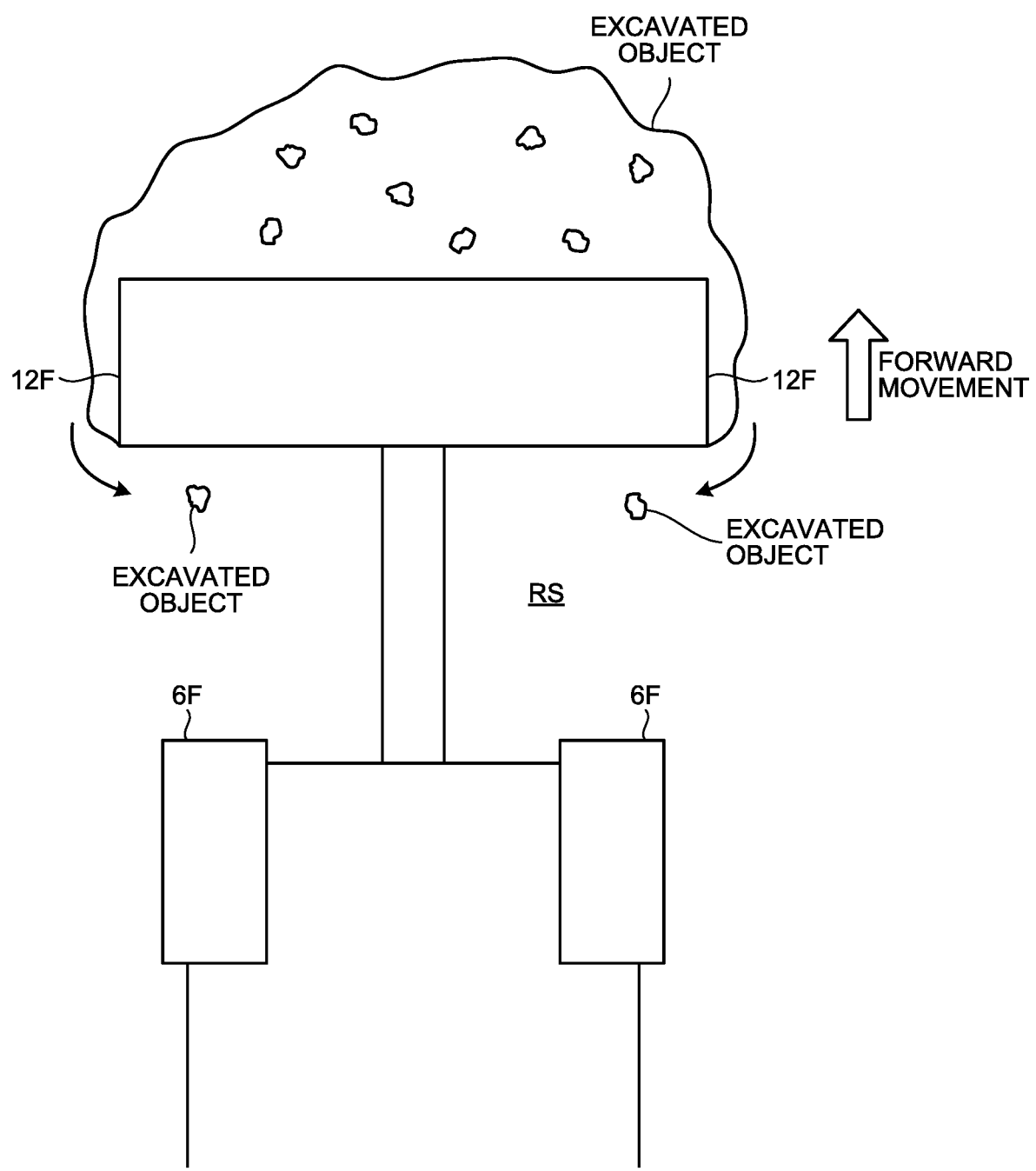

WORKING VEHICLE

FIELD

The present invention relates to a working vehicle.

BACKGROUND

In a technical field related to a working vehicle, a technology of acquiring an image around the working vehicle by using a camera, which technology is disclosed in Patent Literature 1, has been known.

CITATION LIST

Patent Literature

Patent Literature 1: WO 2012/157379

SUMMARY

Technical Problem

In a working vehicle including an excavation member, such as a bucket or a blade, and a wheel to which a tire is mounted, there is a case where a part of an excavated object excavated by the excavation member rolls into a front of the tire. It is difficult for a driver in a driver's cabin to visually recognize the excavated object that rolls into the front of the tire. Thus, there is a possibility that the driver moves the working vehicle forward without realizing the excavated object that rolls into the front of the tire and the tire runs on the excavated object. For example, in a case where the excavated object is a stone with a sharp edge, there is a possibility that the tire that runs on the stone gets broken.

An aspect of the present invention is to provide a working vehicle that can support checking of an excavated object, which rolls from an excavation member into a front of a tire, and that can control breakage of the tire.

Solution to Problem

According to a first aspect of the present invention, a working vehicle comprises: a vehicle main body to which a tire is mounted; an excavation member coupled to the vehicle main body on a front side of the vehicle main body, the excavation member including an end part arranged on an outer side of the tire in a vehicle-width direction of the vehicle main body; a hydraulic cylinder arranged in a center part in the vehicle-width direction, the hydraulic cylinder being to move the excavation member; a housing that houses a power transmission mechanism to transmit power to the tire; and a camera supported by a part of the vehicle main body on a lower side of the hydraulic cylinder and on an upper side of the housing, the camera acquiring an image of a region that includes end parts on both sides of the excavation member and is between the excavation member and the tire.

Advantageous Effects of Invention

According to an aspect of the present invention, a working vehicle that supports checking of an excavated object, which rolls from an excavation member into a front of a tire, and that can control breakage of the tire is provided.

BRIEF DESCRIPTION OF DRAWINGS

FIG. 10 is a view schematically illustrating an example of a behavior of an excavated object of when the wheel loader moves forward toward the excavated object with a bucket being in contact with a ground in order to excavate the excavated object with the bucket.

DESCRIPTION OF EMBODIMENTS

In the following, an embodiment according to the present invention will be described with reference to the drawings. However, the present invention is not limited to this. Components of the embodiment described in the following can be arbitrarily combined. Also, there is a case where a part of the components is not used.

Figure 1:
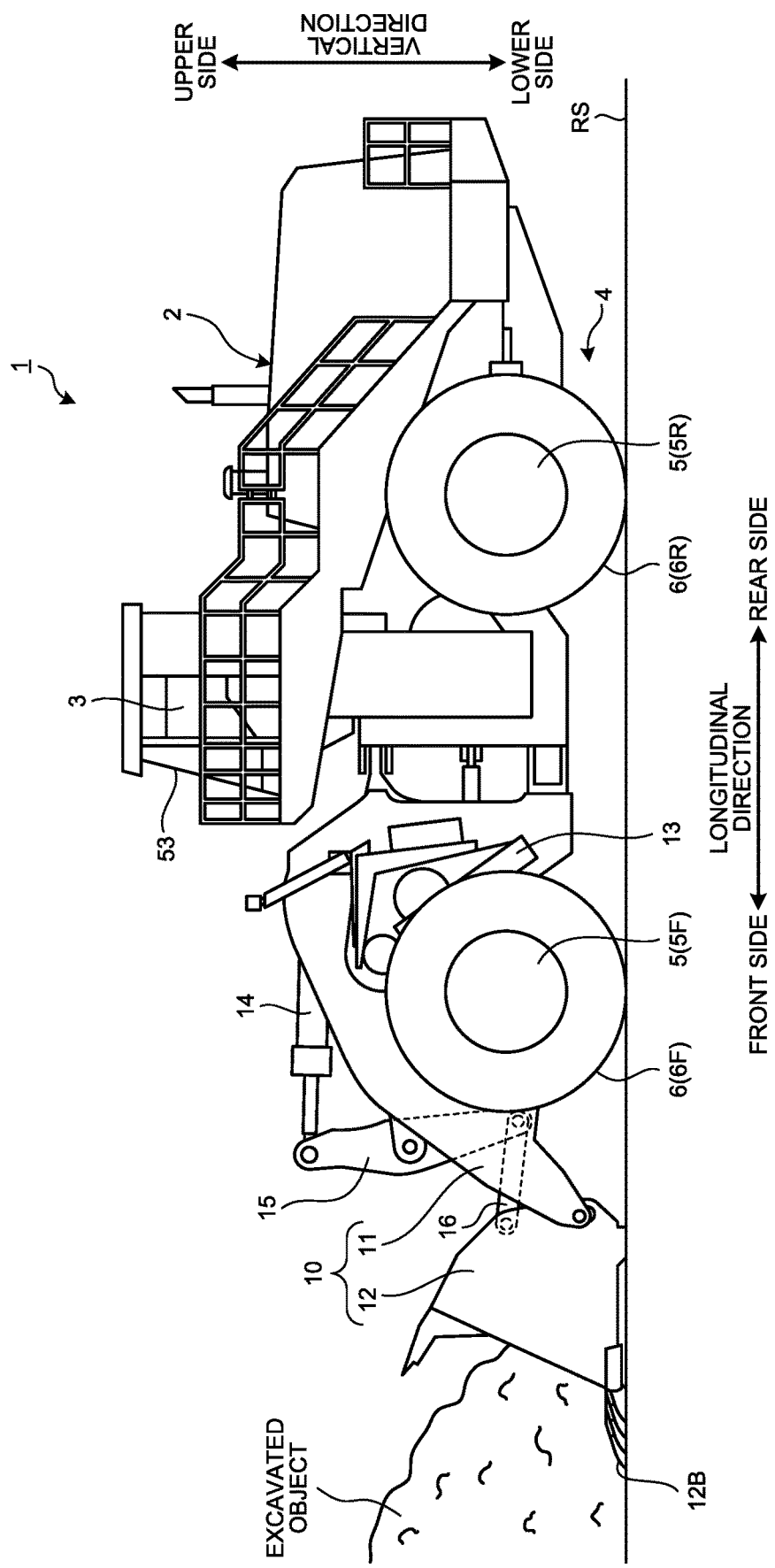
FIG. 1 is a side view illustrating an example of a working vehicle according to a present embodiment.
Figure 2:
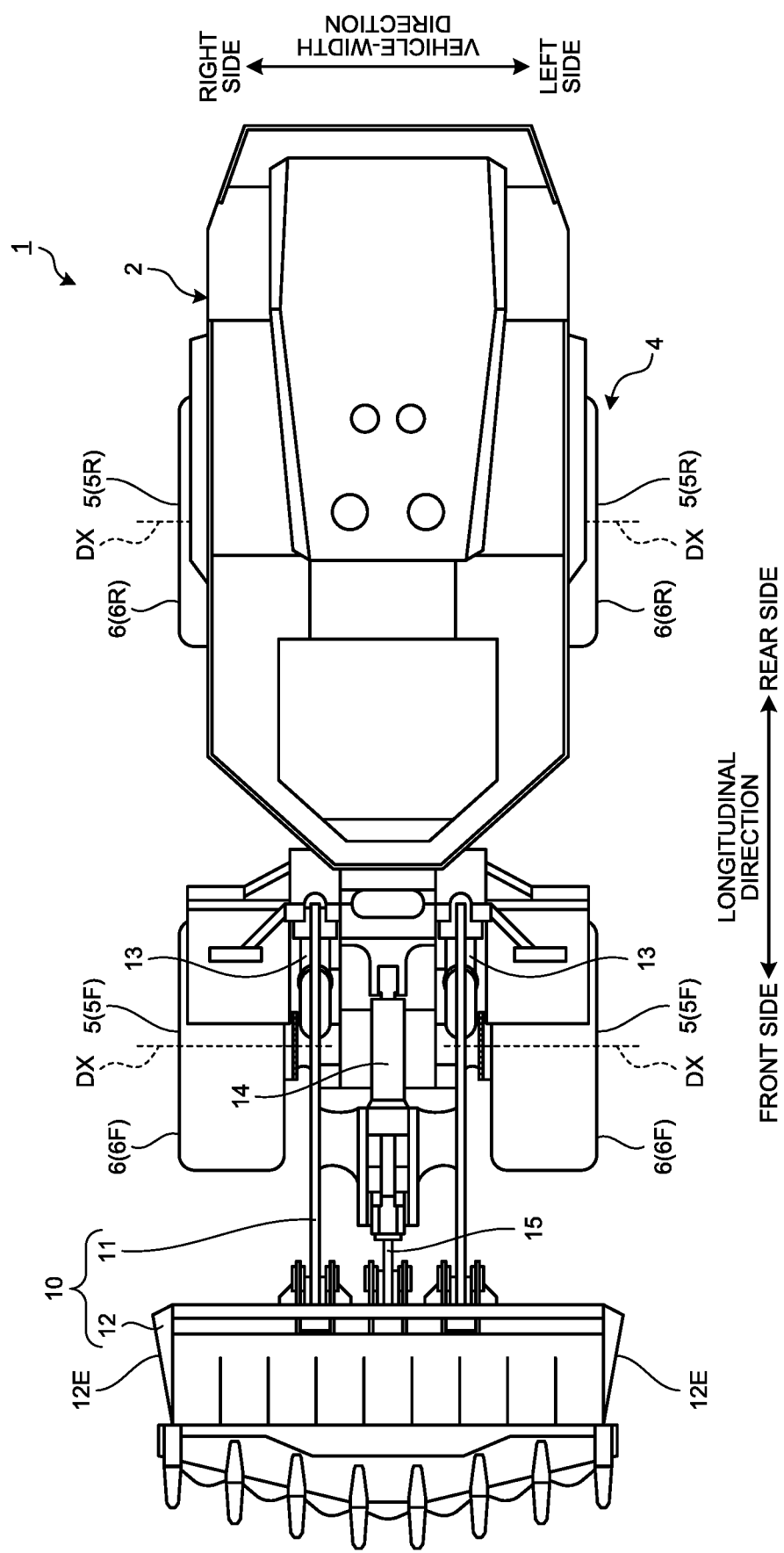
FIG. 2 is a top view illustrating the example of the working vehicle according to the present embodiment.
Figure 3:
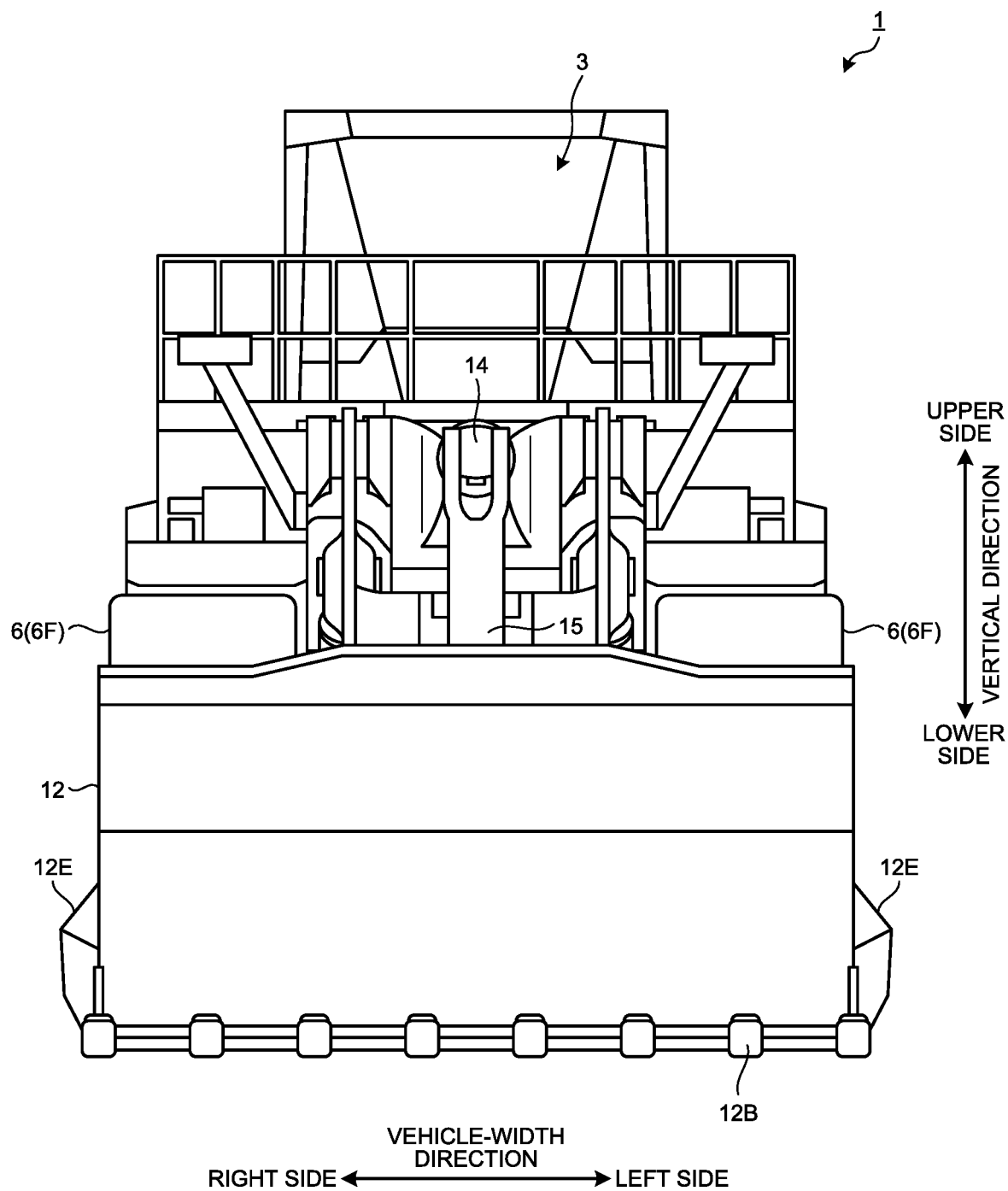
FIG. 3 is a front view illustrating the example of the working vehicle according to the present embodiment.

FIG. 1 is a side view illustrating an example of a working vehicle 1 according to the present embodiment. FIG. 2 is a top view illustrating the example of the working vehicle 1 according to the present embodiment. FIG. 3 is a front view illustrating the example of the working vehicle 1 according to the present embodiment. In the present embodiment, an example in which the working vehicle 1 is a wheel loader 1 will be described.

As illustrated in FIG. 1, FIG. 2, and FIG. 3, the wheel loader 1 includes a vehicle main body 2, and a working machine 10 supported by the vehicle main body 2.

The vehicle main body 2 includes a driver's cabin 3, a traveling device 4, and an engine (not illustrated) that generates power to drive the traveling device 4. The wheel loader 1 is operated by a driver in the driver's cabin 3. In the driver's cabin 3, a driving operation device operated by the driver is arranged. For example, the driving operation device includes a transmission shift lever, an accelerator pedal, a brake pedal, and a working machine lever to operate the working machine 10. By operating the driving operation device, the driver performs adjustment of a traveling speed of the wheel loader 1, switching of forward movement and backward movement, and operation of the working machine 10.

The traveling device 4 includes wheels 5 that are rotatable around a rotational axis DX. Tires 6 are mounted to the wheels 5. The wheels 5 include two front wheels 5F and two rear wheels 5R. The tires 6 include front tires 6F mounted to the front wheels 5F and rear tires 6R mounted to the rear wheels 5R. The traveling device 4 can travel on a ground RS.

In the following description, a direction parallel to the rotational axis DX of when the wheel loader 1 travels in a straight line is arbitrarily referred to as a vehicle-width direction of the vehicle main body 2, a direction parallel to a vertical axis orthogonal to the ground RS is arbitrarily referred to as a vertical direction of the vehicle main body 2, and a direction orthogonal to both of the rotational axis DX and the vertical axis is arbitrarily referred to as a longitudinal direction of the vehicle main body 2.

In the present embodiment, a direction in which the working machine 10 is present with a driver seated in a driver's seat in the driver's cabin 3 as a reference is a front side and the opposite direction of the front side is a rear side. One side in the vehicle-width direction is a right side and the opposite direction of the right side is a left side. The front wheels 5F are arranged on the front side of the rear wheels 5R. The front wheels 5F are respectively arranged on both sides in the vehicle-width direction of the vehicle main body 2. The rear wheels 5R are respectively arranged on both sides in the vehicle-width direction of the vehicle main body 2.

The working machine 10 includes a lift arm 11 movably coupled to the vehicle main body 2, a bucket 12 that is an excavation member movably coupled to the lift arm 11, and a bell crank 15.

The lift arm 11 is actuated by power generated by a lift cylinder 13. The lift cylinder 13 is a hydraulic cylinder that generates power to move the lift arm 11. One end part of the lift cylinder 13 is coupled to the vehicle main body 2 and the other end part of the lift cylinder 13 is coupled to the lift arm 11. Two lift cylinders 13 are provided. One of the lift cylinders 13 is provided on a right side of a center in the vehicle-width direction and the other one of the lift cylinders 13 is provided on a left side of the center in the vehicle-width direction. When the driver operates the working machine lever, the lift cylinders 13 are extended/contracted. Thus, the lift arm 11 moves in the vertical direction.

The bucket 12 is an excavation member including a blade edge 12B. Note that the excavation member may be a blade having a blade edge. The bucket 12 is coupled to a leading end part of the lift arm 11 and is coupled to the vehicle main body 2 via the lift arm 11. The bucket 12 is actuated by power generated by a bucket cylinder 14. The bucket cylinder 14 is a hydraulic cylinder that generates power to move the bucket 12. A center part of the bell crank 15 is rotatably coupled to the lift arm 11. One end part of the bucket cylinder 14 is coupled to the vehicle main body 2 and the other end part of the bucket cylinder 14 is coupled to one end part of the bell crank 15. The other end part of the bell crank 15 is coupled to the bucket 12 via a tilt rod 16. One bucket cylinder 14 is provided. The bucket cylinder 14 is arranged in a center part in the vehicle-width direction. When the driver operates the working machine lever, the bucket cylinder 14 is extended/contracted. Accordingly, the bucket 12 moves in the vertical direction. The bucket 12 moves on the front side of the vehicle main body 2.

As illustrated in FIG. 2 and FIG. 3, end parts 12E on both sides in the vehicle-width direction of the bucket 12 are arranged on outer sides in the vehicle-width direction of the tires 6. That is, a distance in the vehicle-width direction between a right-side end part 12E and a left-side end part 12E of the bucket 12 is longer than a distance in the vehicle-width direction between an outer surface of a right tire 6 and an outer surface of a left tire 6.

Figure 4:
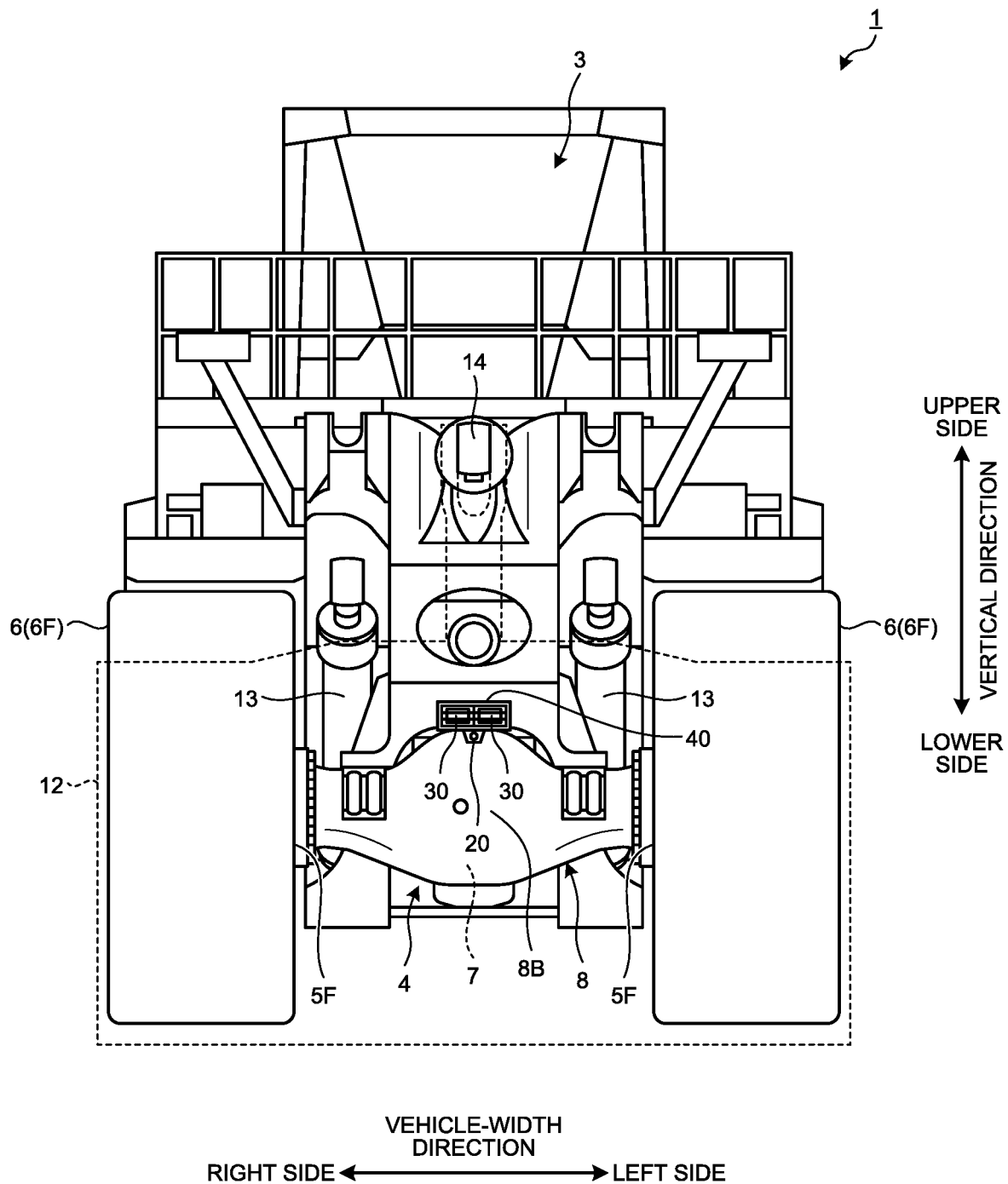
FIG. 4 is a front view illustrating a part of the working vehicle according to the present embodiment.

FIG. 4 is a front view illustrating a part of the wheel loader 1 according to the present embodiment and corresponding to a view from which the bucket 12 is omitted. In the present embodiment, the traveling device 4 includes a power transmission mechanism 7 to transmit power generated by the engine to the front wheels 5F, and a housing 8 that houses at least a part of the power transmission mechanism 7. The engine is arranged in a rear part of the vehicle main body 2. The power generated by the engine is transmitted to the right and left front wheels 5F through a differential gear of the power transmission mechanism 7. The differential gear is housed in a spherical part 8B of the housing 8. In the following description, the spherical part 8B of the housing 8 which part houses the differential gear is arbitrarily referred to as an axle ball 8B. The axle ball 8B is arranged in the center part in the vehicle-width direction. Also, the axle ball 8B is arranged on a lower side of the bucket cylinder 14.

Figure 5:
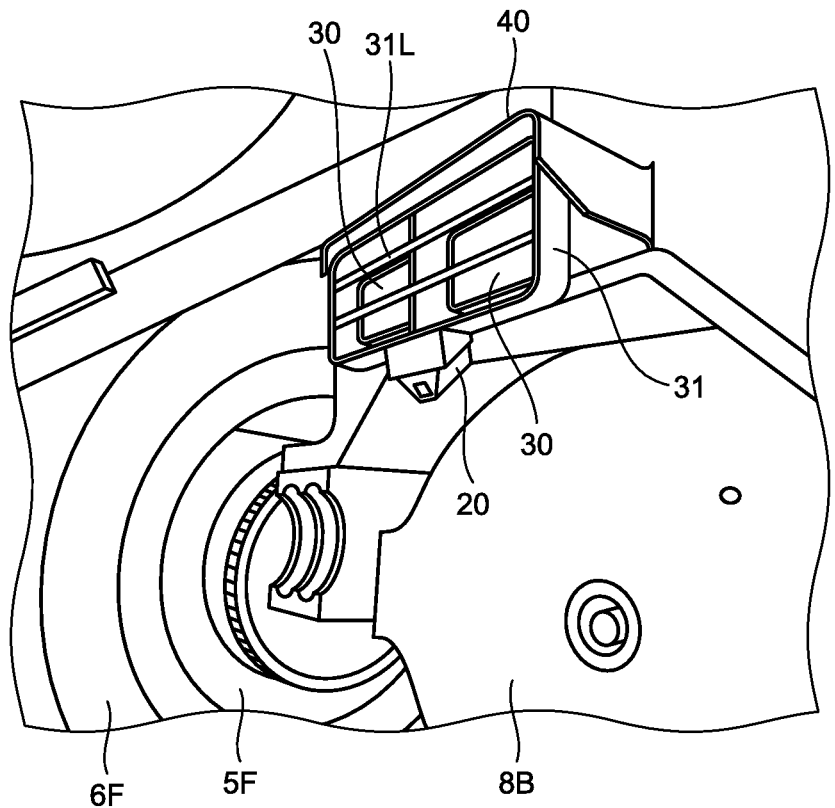
FIG. 5 is a perspective view in which a part of a wheel loader according to the present embodiment is enlarged.

FIG. 5 is a perspective view in which a part of the wheel loader 1 according to the present embodiment is enlarged. As illustrated in FIG. 4 and FIG. 5, in the present embodiment, the wheel loader 1 includes a camera 20 supported by at least a part of the vehicle main body 2 and that acquires an image of a region between the bucket 12 and the front tires 6F.

In the present embodiment, the camera 20 is arranged on a lower side of the bucket cylinder 14. Also, the camera 20 is arranged on an upper side of the axle balls 8B of the housing 8. One camera 20 is arranged in the center part in the vehicle-width direction. The camera 20 is arranged on a slightly front side of the axle balls 8B.

Also, in the present embodiment, the wheel loader 1 includes an illumination device 30 supported by the vehicle main body 2 and that illuminates a photographing region of the camera 20. The illumination device 30 includes a headlight that emits illumination light. In the present embodiment, two illumination devices 30 are provided on an upper side of the camera 20. Also, the illumination devices 30 are housed in a casing 31. The casing 31 includes a rod member 31L that protects the illumination devices 30 without blocking emission of the illumination light. The rod member 31L is arranged on a front side of the illumination devices 30.

Also, the wheel loader 1 includes a cover member 40 arranged between the bucket cylinder 14 and the camera 20 in the vertical direction and that protects the camera 20. In the present embodiment, the cover member 40 is an eaves member arranged on an upper side of the camera 20 and the illumination devices 30.

Figure 6:
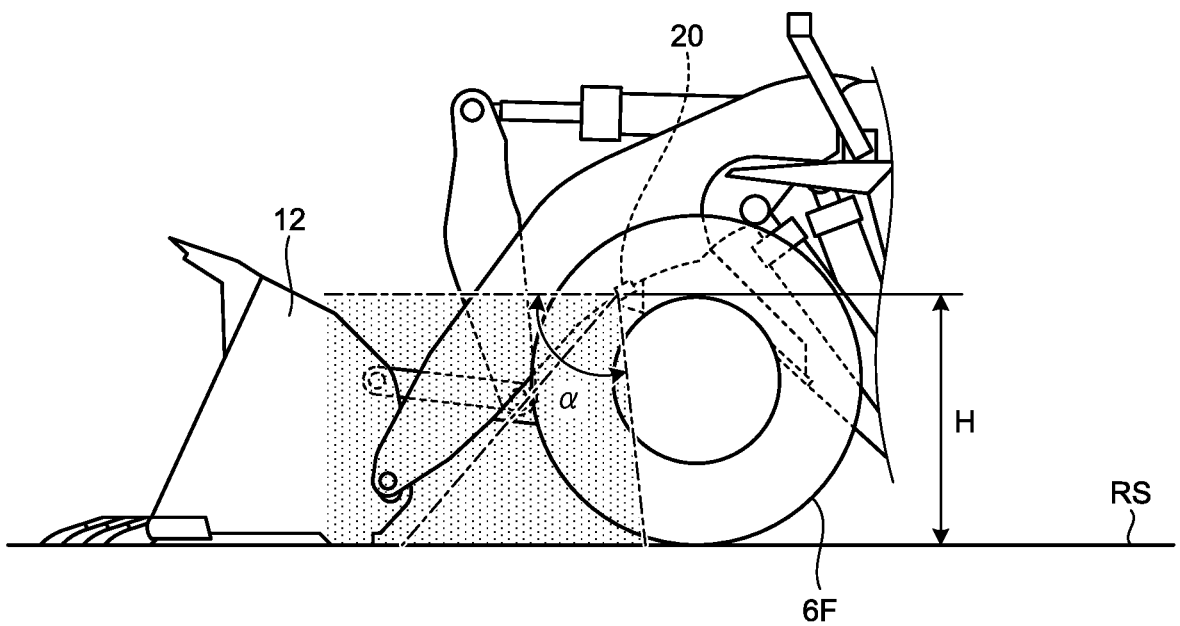
FIG. 6 is a schematic view for describing a photographing region of a camera according to the present embodiment.
Figure 7:
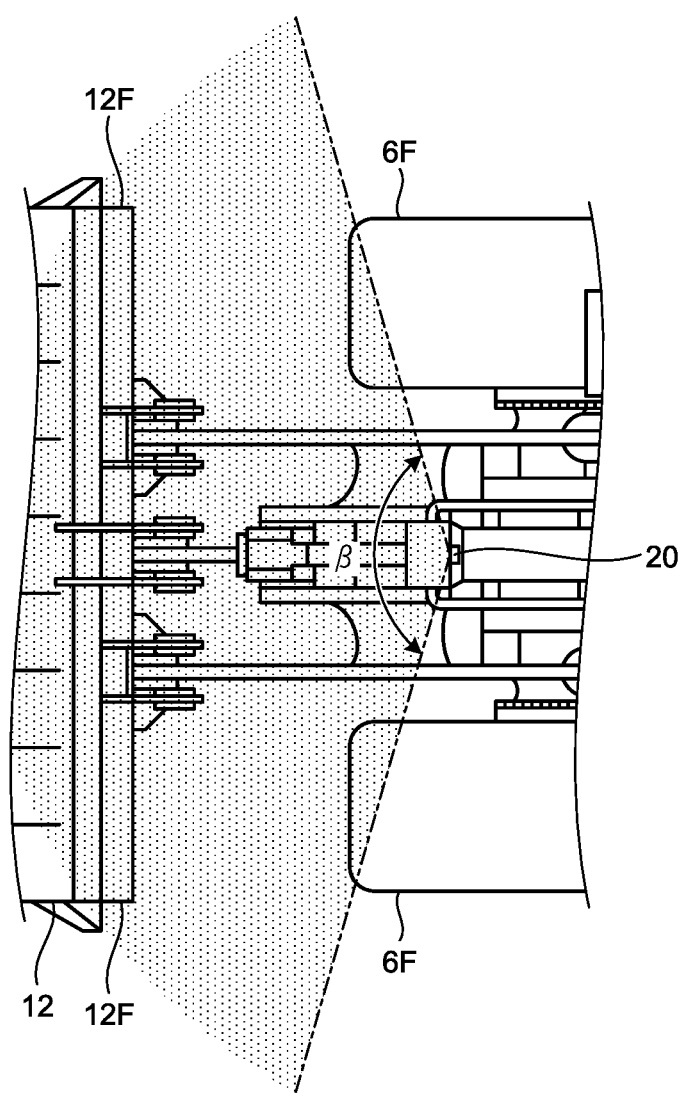
FIG. 7 is a schematic view for describing the photographing region of the camera according to the present embodiment.

FIG. 6 and FIG. 7 are schematic views for describing the photographing region of the camera 20 according to the present embodiment. The photographing region of the camera 20 includes a field-of-view region of an optical system of the camera 20.

As illustrated in FIG. 6, a height H that is a distance in the vertical direction between the ground RS and the camera 20 is equal to or higher than 1500 [mm] and is equal to or shorter than 1800 [mm]. Also, an angle of view $\alpha$ in the longitudinal direction of the camera 20 is equal to or higher than 90[°] and is equal to or lower than 100[°]. As illustrated in FIG. 7, an angle of view $\beta$ in the vehicle-width direction of the camera 20 is about 120[°].

The camera 20 acquires image data of a region between the bucket 12 and the front tires 6F. In the present embodiment, the photographing region of the camera 20 is a region of the ground RS between the bucket 12, which is in a grounded state and in contact with the ground RS, and the front tires 6F.

As illustrated in FIG. 7, the photographing region of the camera 20 includes end parts 12F on both sides of the bucket 12. Also, as illustrated in FIG. 6, the photographing region of the camera 20 includes front parts of the front tires 6F. That is, in the present embodiment, in a state in which the bucket 12 is lowered in such a manner as to contact with the ground RS, the camera 20 photographs the ground RS between the bucket 12 and the front tires 6F in such a manner that the end parts 12F on the both sides of the bucket 12 and the front parts of the front tires 6F are photographed.

Figure 8:
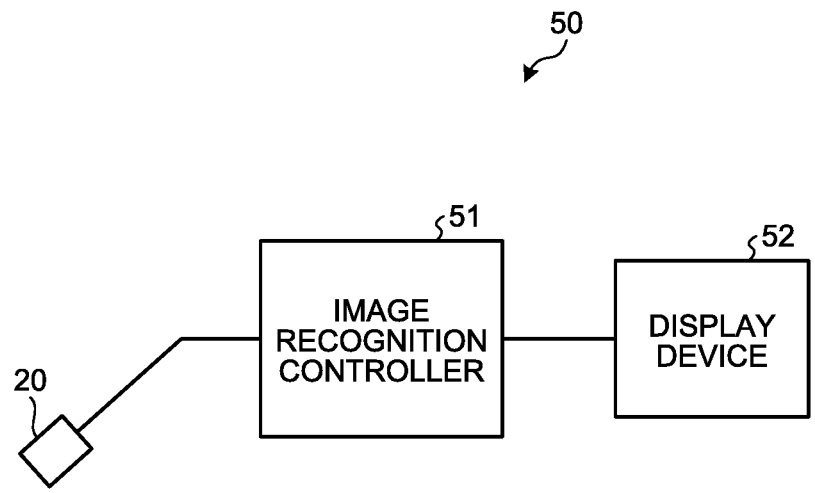
FIG. 8 is a block diagram illustrating an example of an image recognition system according to the present embodiment.

FIG. 8 is a block diagram illustrating an example of an image recognition system 50 according to the present embodiment. The image recognition system 50 includes an image recognition controller 51 that performs image processing of image data acquired by the camera 20, and a display device 52 that displays image data generated by the image recognition controller 51.

The camera 20 has a video camera function of acquiring video data of the photographing region. The image data (video data) acquired by the camera 20 is output to the image recognition controller 51 mounted in the wheel loader 1. The image recognition controller 51 generates video data to be displayed on the display device 52 by performing image processing of the image data acquired by the camera 20. The display device 52 displays the video data generated by the image recognition controller 51. The video data acquired by the camera 20 is displayed on the display device 52 in real time.

Figure 9:
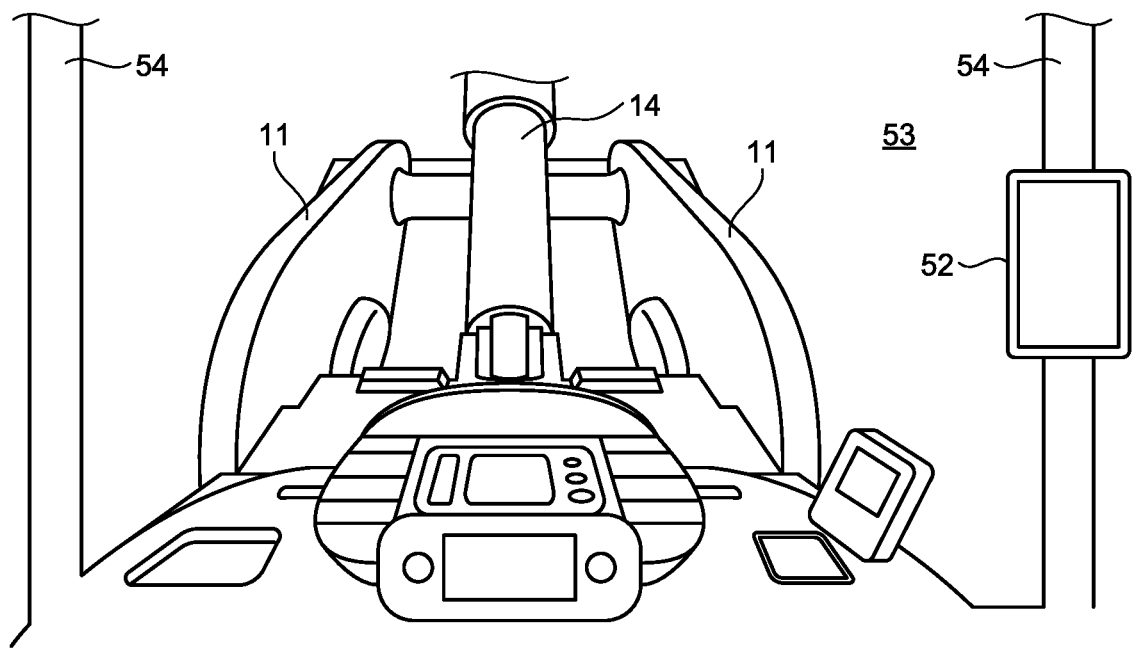
FIG. 9 is a view schematically illustrating an example of a driver's cabin according to the present embodiment.

FIG. 9 is a view schematically illustrating an example of the driver's cabin 3 according to the present embodiment. In FIG. 9, a view seen by the driver seated in the driver's seat in the driver's cabin 3 is schematically illustrated.

The display device 52 is arranged in the driver's cabin 3 of the vehicle main body 2. The display device 52 displays the video data acquired by the camera 20. The driver can visually recognize a situation of the ground RS between the bucket 12 and the front tires 6F by looking at the display device 52 provided in the driver's cabin 3.

In the driver's cabin 3, a plurality of devices such as an instrument, an electronic device, a monitor device, and a driving operation device is provided. A windshield 53 is provided in a front part of the driver's cabin 3. The windshield 53 is supported by a pillar 54 of the driver's cabin 3. The display device 52 that displays the video data acquired by the camera 20 is supported by the pillar 54. Since the display device 52 is supported by the pillar 54, the driver can visually recognize a situation of the outside through the windshield 53 without being blocked by the display device 52.

As illustrated in FIG. 9, in the wheel loader 1, the driver in the driver's cabin 3 can visually recognize the lift arm 11, the bucket cylinder 14, and the like through the windshield 53. However, it is difficult to visually recognize a situation of the ground RS. Specifically, it is difficult to visually and directly recognize a situation of the ground RS between the bucket 12 in the grounded state and the front tires 6F.

In the present embodiment, video data of the ground RS between the bucket 12 in the grounded state and the front tires 6F is acquired by the camera 20 and is displayed on the display device 52. Accordingly, the driver can visually recognize the situation of the ground RS between the bucket 12 in the grounded state and the front tires 6F through the camera 20 and the display device 52.

For example, as illustrated in FIG. 1, in the wheel loader 1, operation of forward movement toward an excavated object is often performed in a state in which the bucket 12 is in contact with the ground RS. In a case where the operation is performed, there is a case where a part of the excavated object excavated by the bucket 12 rolls into the front of the front tires 6F.

FIG. 10 is a view schematically illustrating an example of a behavior of an excavated object of when the wheel loader 1 moves forward toward the excavated object with the bucket 12 being in contact with the ground RS in order to excavate the excavated object with the bucket 12. As illustrated in FIG. 10, there is a case where a part of an excavated object on a front side of the bucket 12 which part cannot be held by the bucket 12 moves to a rear side of the bucket 12 through the end parts 12F of the bucket 12 and rolls into the front of the front tires 6F.

In a case where it is difficult for the driver of the wheel loader 1 to grasp a situation of the ground RS between the bucket 12 in the grounded state and the front tires 6F, the driver moves the wheel loader 1 forward without realizing the excavated object that rolls into the front of the front tires 6F. As a result, the front tires 6F run on the excavated object. For example, in a case where the excavated object is a stone with a sharp edge, there is a possibility that the front tires 6F that run on the stone get broken.

In the present embodiment, the camera 20 that acquires video data of the ground RS between the bucket 12 and the front tires 6F is provided and the video data acquired by the camera 20 is displayed on the display device 52 in real time. Thus, the driver of the wheel loader 1 can promptly and smoothly grasp a situation of the ground RS between the bucket 12 in the grounded state and the front tires 6F.

The driver can take action for controlling breakage of the front tires 6F by looking at the video data displayed on the display device 52. In a case of recognizing that an excavated object rolls into the front of the front tires 6F by looking at the video data displayed on the display device 52, the driver can take action to control breakage of the front tires 6F which action is, for example, stopping the wheel loader 1 by operating a brake pedal, or changing a moving direction of the wheel loader 1 in order to prevent the front tires 6F from running on the excavated object.

As described above, according to the present embodiment, since the camera 20 that acquires video data of the photographing region between the excavation member 12 with a blade edge, which member is such as a bucket or a blade, and the front tires 6F is provided in the wheel loader 1, checking of an excavated object, which rolls from the excavation member 12 into the front of the front tires 6F, by the driver is supported by the camera 20. Accordingly, the driver can take action to control breakage of the front tires 6F.

Also, according to the present embodiment, the camera 20 photographs a region of a road surface RS between the lowered excavation member 12 in the grounded state and the front tires 6F. When the excavation member 12 in the grounded state moves forward, a part of an excavated object often moves to a rear side of the excavation member 12 and rolls into the front of the front tires 6F. Thus, when the region of the road surface RS between the excavation member 12 in the grounded state and the front tires 6F is photographed by the camera 20, the driver can recognize the excavated object and action to control breakage of the front tires 6F is taken effectively.

Also, according to the present embodiment, the camera 20 is arranged on a lower side of the bucket cylinder 14 arranged in the center part in the vehicle-width direction. Accordingly, the camera 20 can smoothly acquire video data of the photographing region between the excavation member 12 and the front tires 6F without being blocked by the bucket cylinder 14.

Also, according to the present embodiment, the camera 20 is arranged on an upper side of the housing 8 that houses the power transmission mechanism 7. In the present embodiment, the camera 20 is arranged on an upper side of the axle balls 8B that houses the differential gear. Accordingly, the camera 20 is protected by the axle balls 8B. By a rotation of the front tires 6F, there is a possibility that mud is splashed from the ground RS. The axle ball 8B is arranged between the ground RS and the camera 20 in the vertical direction. Thus, it is possible to control attachment of the mud to the camera 20. The axle ball 8B is arranged at a sufficient height from the ground RS. The camera 20 is arranged on an upper side of the axle balls 8B. Accordingly, attachment of the mud from the ground RS to the camera 20 is sufficiently controlled.

Also, in the present embodiment, the cover member 40 that protects the camera 20 is provided between the bucket cylinder 14 and the camera 20. Accordingly, for example, even when the bucket 12 is elevated and a part of an excavated object falls off the elevated bucket 12, the camera 20 is protected by the cover member 40. Thus, breakage of the camera 20 is controlled.

Also, in the present embodiment, the camera 20 is arranged in the center part in the vehicle-width direction. Accordingly, the region of the ground RS between the excavation member 12 and the front tires 6F is evenly photographed by the camera 20.

Also, in the present embodiment, only one camera 20 is arranged in the center part in the vehicle-width direction. Accordingly, a cost of the image recognition system 50 is controlled.

Also, in the present embodiment, the photographing region of the camera 20 includes the end parts 12F on the both sides of the excavation member 12. As described with reference to FIG. 10, a part of an excavated object on a front side of the bucket 12 which part cannot be held by the bucket 12 is likely to move to a rear side of the bucket 12 through the end parts 12F of the bucket 12. Thus, the end parts 12F of the bucket 12 are included in the photographing region to make it possible for the driver to recognize the excavated object, which rolls into the front of the front tires 6F, in an early stage on the basis of the video data acquired by the camera 20.

Also, in the present embodiment, the photographing region of the camera 20 includes front parts of the front tires 6F. Accordingly, the driver can sufficiently recognize a positional relationship between the excavated object, which rolls into the front of the front tires 6F, and the front tires 6F on the basis of the video data acquired by the camera 20 and action to prevent the front tires 6F from running on the excavated object can be appropriately taken.

Moreover, according to the present embodiment, the illumination devices 30 that illuminate the photographing region of the camera 20 are provided. Accordingly, even in operation at night or in a dark place, an image of an excavated object that rolls into the front of the front tires 6F can be acquired by the camera 20.

Also, according to the present embodiment, the display device 52 that displays an image acquired by the camera 20 is arranged in the driver's cabin 3. Accordingly, the driver can recognize a situation of the ground RS between the excavation member 12 and the front tires 6F in real time while operating the wheel loader 1 in the driver's cabin 3.

Note that in the present embodiment, the camera 20 may be arranged at a position shifted from the center part in the vehicle-width direction. Also, a plurality of cameras 20 may be provided.

Note that in the present embodiment, the photographing region of the camera 20 may not include the front parts of the front tires 6F. The camera 20 only needs to be able to acquire video data of the ground RS between the bucket 12 and the front tires 6F.

REFERENCE SIGNS LIST

1 WHEEL LOADER (WORKING VEHICLE)
2 VEHICLE MAIN BODY
3 DRIVER'S CABIN
4 TRAVELING DEVICE
5 WHEEL
5F FRONT WHEEL
5R REAR WHEEL
6 TIRE
6F FRONT TIRE
6R REAR TIRE
7 POWER TRANSMISSION MECHANISM
10 OPERATION MACHINE
11 LIFT ARM
12 BUCKET (EXCAVATION MEMBER)
12B BLADE EDGE
13 LIFT CYLINDER (HYDRAULIC CYLINDER)
14 BUCKET CYLINDER (HYDRAULIC CYLINDER)
15 BELL CRANK
16 TILT ROD
20 CAMERA
30 ILLUMINATION DEVICE
31 CASING
31L ROD MEMBER
40 COVER MEMBER
50 IMAGE RECOGNITION SYSTEM
51 IMAGE RECOGNITION CONTROLLER
52 DISPLAY DEVICE
53 WINDSHIELD

The invention claimed is:

1. A working vehicle comprising:
a vehicle main body to which a tire is mounted;
an excavation member coupled to the vehicle main body on a front side of the vehicle main body, the excavation member including an end part arranged on an outer side of the tire in a vehicle-width direction of the vehicle main body;
a hydraulic cylinder arranged in a center part in the vehicle-width direction, the hydraulic cylinder being to move the excavation member;
an axle ball which is a housing that houses a differential gear of a power transmission mechanism to transmit power to the tire; and
a camera supported by a part of the vehicle main body in the center part in the vehicle-width direction on a lower side of the hydraulic cylinder and on an upper side of the axle ball, the camera acquiring an image of a region that includes the end part on both sides of the excavation member and a front part of the tire and a ground between the excavation member and the tire,
wherein the image acquired by the camera always includes at least the front part of the tire and the ground immediately anterior to the front part of the tire which is in contact with the ground,
wherein the region is between the excavation member in a grounded state and the tire, and the working vehicle is a wheel loader.

2. The working vehicle according to claim 1, comprising a cover member arranged between the hydraulic cylinder and the camera and that protects the camera.

3. The working vehicle according to claim 1, wherein one camera is arranged in the center part in the vehicle-width direction.

4. The working vehicle according to claim 1, comprising an illumination device supported by the vehicle main body and that illuminates the region.

5. The working vehicle according to claim 1, comprising a display device arranged in a driver's cabin provided in the vehicle main body and that displays the image acquired by the camera.

6. The working vehicle according to claim 1, wherein the tire includes inner and outer side walls with a tire portion extending therebetween that is in contact with the ground, the image acquired by the camera including the ground immediately anterior to and across an entire width of the tire portion extending between the side walls at the front part of the tire.

* * * * *